(12) United States Patent
Byers et al.

(10) Patent No.: US 9,767,462 B2
(45) Date of Patent: Sep. 19, 2017

(54) LOCALIZED TIME ZONE DELIVERY SYSTEM AND METHOD

(75) Inventors: Eric Lee Byers, San Diego, CA (US); Daniel Thomas Smith, La Mesa, CA (US)

(73) Assignee: Mapp Digital US, LLC, San Diego, CA (US)

( * ) Notice: Subject to any disclaimer, the term of this patent is extended or adjusted under 35 U.S.C. 154(b) by 1508 days.

(21) Appl. No.: 11/923,281

(22) Filed: Oct. 24, 2007

(65) Prior Publication Data
US 2008/0147809 A1 Jun. 19, 2008

Related U.S. Application Data
(60) Provisional application No. 60/869,863, filed on Dec. 13, 2006.

(51) Int. Cl.
G06Q 40/00 (2012.01)
G06Q 30/02 (2012.01)
G06Q 10/10 (2012.01)

(52) U.S. Cl.
CPC .......... *G06Q 30/02* (2013.01); *G06Q 10/107* (2013.01)

(58) Field of Classification Search
CPC ................................ H04L 12/58; G06F 9/542
USPC ...................................................... 705/35–40
See application file for complete search history.

(56) References Cited

U.S. PATENT DOCUMENTS

| | | | |
|---|---|---|---|
| 6,724,732 B1 | 4/2004 | Abrams et al. | |
| 6,965,926 B1 | 11/2005 | Shapiro et al. | |
| 6,999,565 B1 | 2/2006 | Delaney et al. | |
| 7,216,146 B2 * | 5/2007 | Pous et al. | 709/206 |
| 7,219,109 B1 | 5/2007 | Lapuyade et al. | |
| 2001/0055371 A1 * | 12/2001 | Baxter, Jr. | 379/88.11 |
| 2002/0038347 A1 | 3/2002 | Maeda | |
| 2002/0112240 A1 | 8/2002 | Bacso et al. | |
| 2002/0120697 A1 * | 8/2002 | Generous et al. | 709/206 |
| 2003/0158904 A1 * | 8/2003 | Suzuki | G06Q 30/0207 709/206 |
| 2004/0139452 A1 * | 7/2004 | Hope | G06F 9/542 719/318 |
| 2005/0027742 A1 * | 2/2005 | Eichstaedt et al. | 707/104.1 |

(Continued)

OTHER PUBLICATIONS

"The best time to send your email?" Mark Brownlow, Email Marketing Reports. Datasheet [online]. Email Marketing Reports 2007. [retrieved on Oct. 24, 2007].Retrieved from the internet: <URL:http://www.email-marketing-reports.com/iland/2007/07/best-time-to-send-your-email.html>.

*Primary Examiner* — Edward Baird
(74) *Attorney, Agent, or Firm* — Billion & Armitage; Richard Billion

(57) ABSTRACT

In a preferred embodiment, the objective is to give an e-commerce system user control over when a message is sent so that it arrives at a time that is relative to a subscriber's local time zone. This gives users the ability to send messages to subscribers so that they are received by subscribers at a specific time of day in their time zone. For example, localized time zone delivery would send messages so that they are arrive in the inbox of subscriber "A" located in San Diego around 10:00 AM Pacific Time and around 10:00 AM Eastern Time for subscriber "B" who is located in Boston. Furthermore, localized time zone delivery allows system users to assign a time zone preference value to subscribers in their e-commerce system account.

14 Claims, 3 Drawing Sheets

(56) References Cited

U.S. PATENT DOCUMENTS

| | | | |
|---|---|---|---|
| 2005/0032527 A1* | 2/2005 | Sheha | H04M 1/274583 455/456.1 |
| 2005/0195076 A1* | 9/2005 | McCulloch et al. | 340/500 |
| 2005/0278430 A1* | 12/2005 | Cato | G06Q 10/107 709/206 |
| 2007/0088818 A1* | 4/2007 | Roberts | H04L 63/102 709/224 |

* cited by examiner

US 9,767,462 B2

LOCALIZED TIME ZONE DELIVERY SYSTEM AND METHOD

This application claims the benefit of U.S. Provisional Application No. 60/869,863 filed 13 Dec. 2006, entitled "Localized Time Zone Delivery System and Method," which is incorporated herein by reference.

FIELD OF THE INVENTION

The present invention relates to electronic messaging systems for use on the internet. More particularly, the present invention relates to a system and related tools for time zone based delivery of messages.

BACKGROUND OF THE INVENTION

A uniform resource locator (URL) for a website can usually be accessed from anywhere at any time. However some types of information may be dependent on time. For example, broadcasts are usually viewed by local municipalities and regions. In another example, certain sports broadcasts are "blacked out" regionally due to poor local ticket sales. Furthermore, some broadcasts are restricted by time zone. For instance, election results are often controlled by time zones.

Standard time zones can be defined by geometrically subdividing the Earth's spheroid into 24 lunes (wedge-shaped sections), bordered by meridians each 15° of longitude apart. The local time in neighboring zones is then exactly one hour different. However, political and geographical practicalities can result in irregularly-shaped zones that follow political boundaries or that change their time seasonally (as with daylight saving time), as well as being subject to occasional redefinition as political conditions change. Additionally, there are variations of the definitions of time zone which generally fall into two meanings: a time zone can represent a region where the local time is some fixed offset from a global reference, or a time zone can represent a region throughout which the local time is always consistent even though the offset may fluctuate seasonally.

An obvious surge in worldwide communication over the years has increased the need for interacting parties to communicate mutually comprehensible time references to one another. Sophisticated e-mail clients may have all sorts of bells and whistles, but at the core, e-mail clients basically just send simple text messages to recipients. In the beginning and even today, e-mail messages tend to be short pieces of text, although the ability to add attachments now makes many e-mail messages quite long. Even with attachments, however, e-mail messages continue to be text messages. Email clients show lists of all of the messages in mailboxes by displaying the message headers. The header shows who sent the mail, the subject of the mail and may also show the time and date of the message and the message size. They let a user select a message header and read the body of the e-mail message. Also, they allow the user to create new messages and send them.

E-commerce companies love e-mail, and for good reason. Production costs are low; results are immediate. Personalized e-mail are messages that consumers sign up to receive or that companies can target at customers based on their previous purchases. Furthermore, targeted e-mail marketing requires a much bigger investment than simply blasting out untargeted e-mail messages because it involves sophisticated databases and statistical modeling.

Targeted e-mail is also more prone to error. Sending a personalized message to the wrong person can ruin a relationship for life. So can a message that overloads a customer's computer. But as long as the e-commerce company chooses the right words and format, experts agree that talking to customers is not only good for sales but also good for name recognition. Any excuse to interact with your customer is healthy for the brand, and targeted e-mail seems to be one of healthiest direct-marketing ways to build brand equity.

Accordingly, the ability to market a product or service to individuals who are accessible on the Internet is becoming increasingly important. Email systems exist today for sending email to a target set of email addresses for purposes such as marketing, information acquisition, and otherwise. A system for sending email to a number of email targets for such purposes may be called an email campaign.

Thus, it would be desirable to have a system and a method for regional and time zone based messaging that addresses the inefficiencies of conventional approaches and provides further enhancements to message distribution.

The present invention provides a solution to these needs and other problems, and offers other advantages over the prior art.

BRIEF SUMMARY OF THE INVENTION

In a preferred embodiment, the objective is to give an e-commerce system user control over when a message is sent so that it arrives at a time that is relative to a subscriber's local time zone. This gives users the ability to send messages to subscribers so that they are received by subscribers at a specific time of day in their time zone. For example, localized time zone delivery would send messages so that they are arrive in the inbox of subscriber "A" located in San Diego around 10:00 AM Pacific Time and around 10:00 AM Eastern Time for subscriber "B" who is located in Boston. Furthermore, localized time zone delivery allows system users to assign a time zone preference value to subscribers in their e-commerce system account.

Additional advantages and features of the invention will be set forth in part in the description which follows, and in part, will become apparent to those skilled in the art upon examination of the following or may be learned by practice of the invention.

DETAILED DESCRIPTION

In a preferred embodiment, localized time zone delivery system and method gives an electronic commerce (e-commerce) system user control over when a message is sent such that it arrives at a time that is relative to a subscriber's local time zone. Thus, it gives users the ability to send messages to subscribers so that they are received by subscribers at a specific time of day in their time zone. It will be understood that a user can be a customer, administrator, customer representative, or client.

Figure 1:
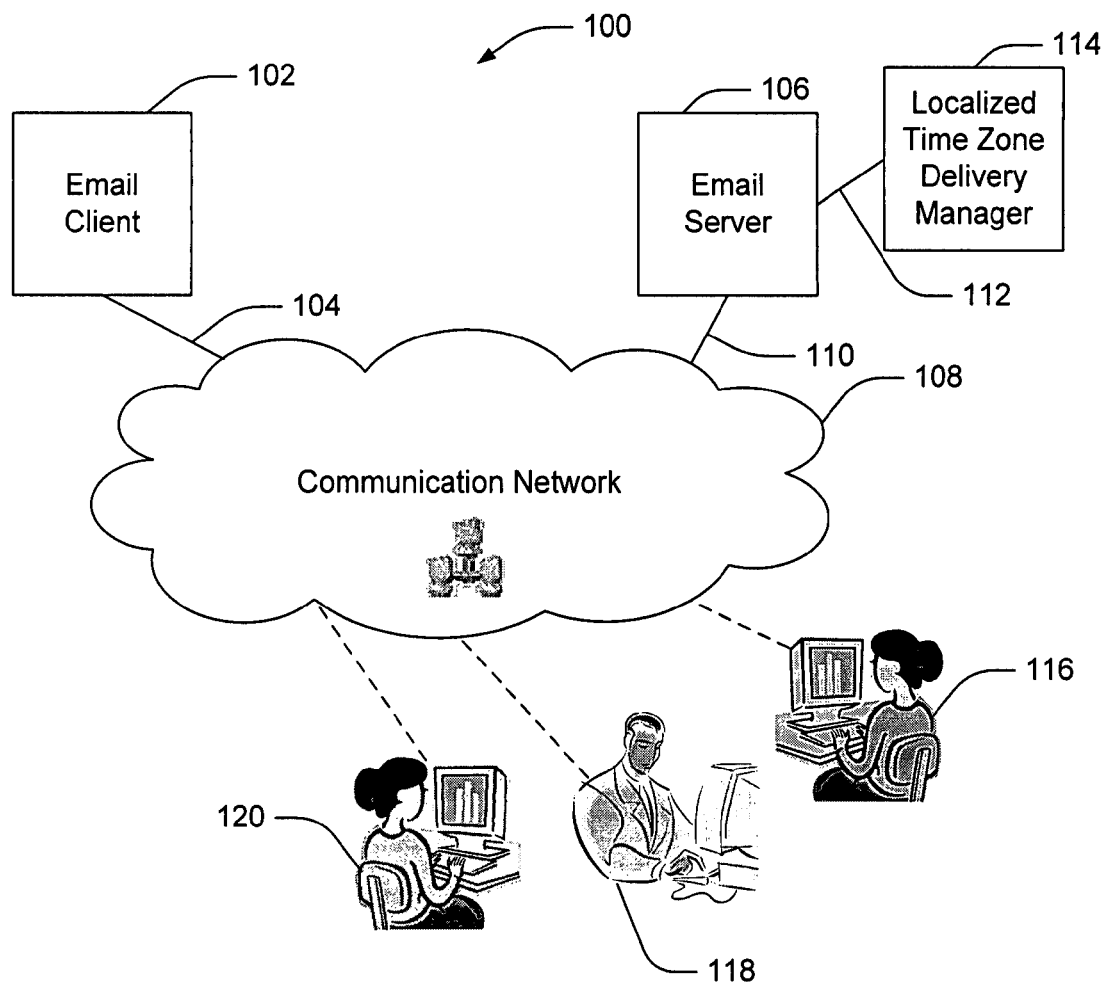
FIG. 1 illustrates an overview diagram of localized time zone delivery working over a network with subscribers.

Referring now to FIG. 1, an overview diagram 100 is shown. Localized time zone delivery system and method sends messages so that they arrive in the inbox of subscriber "A" 116 located in San Diego around 10:00 AM Pacific Time and around 10:00 AM Eastern Time for subscriber "B" 118 who is located in Boston. Subscriber "C" 120 would receive the message 10:00 AM Central Time located in Oklahoma City. Furthermore, localized time zone delivery allows system users to assign a time zone preference value to subscribers in their e-commerce system account. As shown in FIG. 1, an email client 102 links 104 to a communication network 108. The email client 102 is an application used to send, receive, store and view e-mail. The communication network 108 passes 110 data to an email server 106. The email server 106 is a computer program or software agent that transfers electronic mail messages from one computer to another. Thereafter, a localized time zone delivery manager 114 works 112 integrally with the email server 106 to construct a particular time zone specific message. This message will be relative to a subscriber's local time zone.

Table 1 describes some commonly used terms in this industry. Furthermore, definitions in the following table are intended to clarify terms and concepts used within this document.

TABLE 1

Commonly Used Terms

| Term | Definition |
| --- | --- |
| ISP | Internet Service Provider at which the subscriber's email address resides |
| Subscriber | A contact within an e-commerce system which has an email address |
| Day Part | Describes the ability to send a marketing message at a specific time |
| GMT | Greenwich Mean Time - the international standard for 0:00 Hours in the 24 hour time scale. Used by applications to indicate a universal time from which to calculate local time. |

In a preferred embodiment, localized time zone delivery system and method also modifies a user interface for sending and mail processing for scheduled messages. This allows a user to specify that the message be sent to subscribers according to their local time zone preferences. The options displayed for time zones that have already occurred can be either "time zones past are sent immediately" or "send next available time (sometime next day)".

Figure 2:
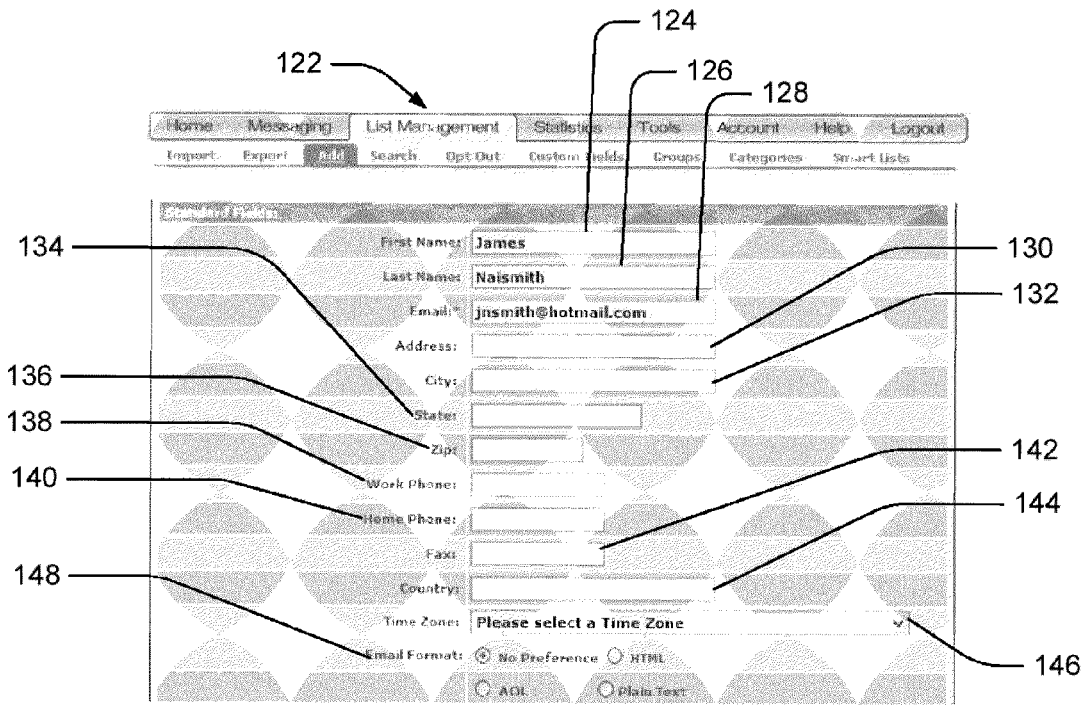
FIG. 2 illustrates an example subscriber sign-up page.

Referring now to FIG. 2, a subscriber sign-up page is shown. Under a List Management tab 122, a subscriber's contact information may be added. For instance, First name 124, Last Name 126, Email 128, Address 130, City 132, State 134, Zip 136, Work phone 138, Home phone 140, Fax 142, and Country 144 are some fields that may be included for contact information. It will be understood by one of ordinary skill in the art that the subscriber sign—up page could also be a subscriber profile page, import process page, and export pages. These pages can be utilized in an email campaign system. Localized time zone delivery displays country level mapping of time zones included within the subscriber sign-up page. It displays "Time zone" values in the format of "00:00 AM/PM" (Relative to GMT). The subscriber sign-up page as shown includes "Time zone" fields 146. There is a default system action that is used in the sending process if subscribers in a segment do not have a value in "Time zone" fields 146. By selecting a value in a drop down menu under the "Time zone" field 146, localized time zone delivery system will be able to send messages to the subscriber based on their local time. Finally, Email format 148 allows a user to select which type of email they prefer.

Figure 3:
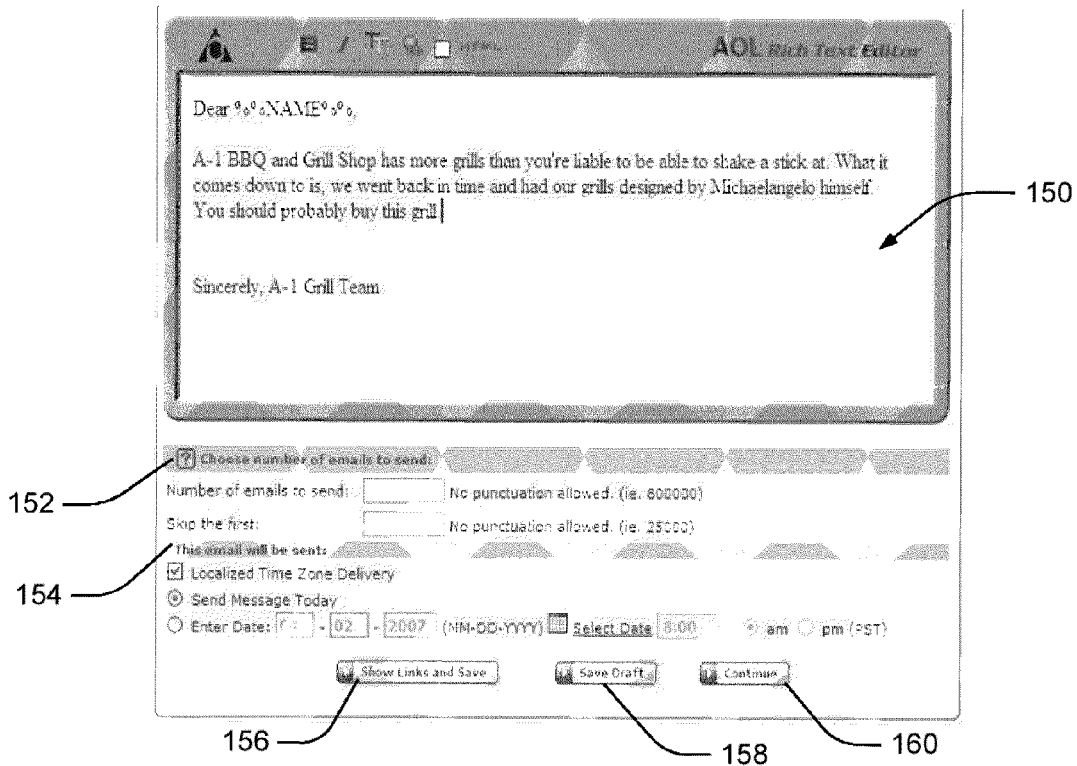
FIG. 3 describes an example email editor page to modify messages to subscribers.

FIG. 3 shows an email editor page. In another embodiment, the user may make changes to the scheduled message sending, retrieval, and statistical pages. Scheduled messages may include new rich text, message wizard, and advanced message types. Retrieved scheduled messages include Rich Text, message wizard, and advanced message types. Window 150 is where the user can enter text to be sent in the message to the subscriber. Section 152 is where the user may specify how many emails to send and which to skip. Section 154 in the email editor page is where the user can click whether or not to send information based on the local time zone of the subscriber. They can send the message today or enter a particular date. Show links and Save 156, Save draft 158, and Continue 160 are buttons the user can click after entering the above information to save and move forward in the message sending process.

Figure 4:
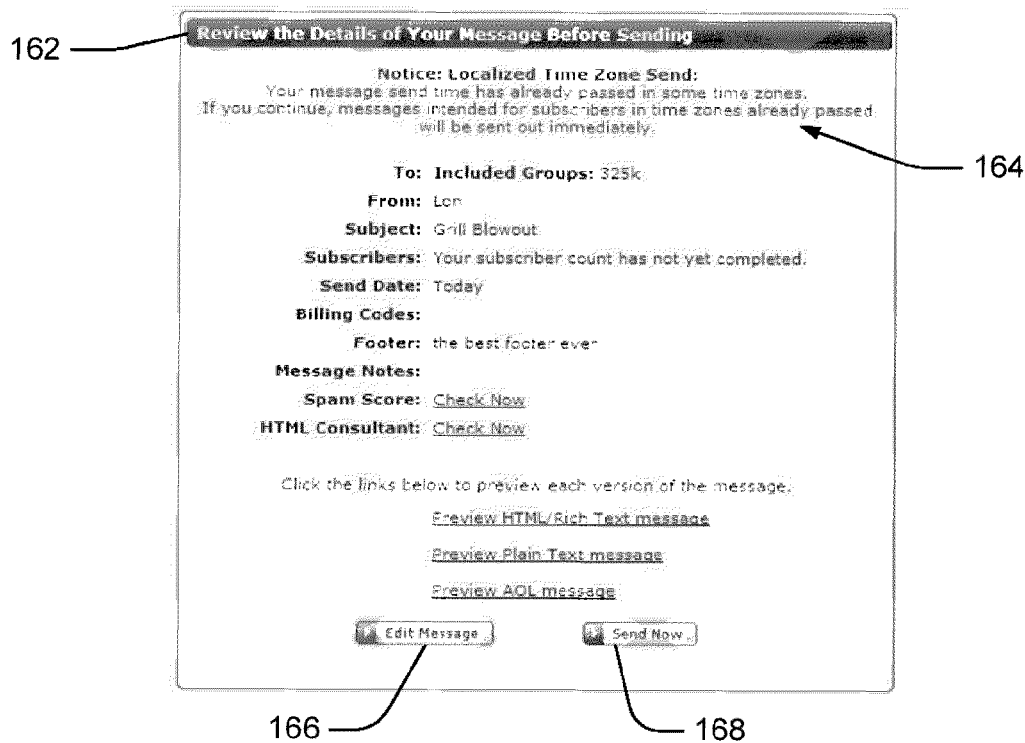
FIG. 4 shows a warning page that may occur before scheduled messages are sent out to subscribers FIG. 5 describes an example sub account and reseller administration page to opt out of scheduled messages.

Additionally, FIG. 4 illustrates a warning page 162 that occurs before scheduled messages are sent out to subscribers. Text 164 warns the user if the scheduled message is being sent in a time already passed in some time zones. If so, the user may opt to send those particular messages out immediately, and the timely messages during the proposed time zone periods. Edit message 166 button and Send now 168 button are options for the user to click to edit or send the messages. The user may also preview HTML, rich text, plain text, or America Online (AOL) messages by clicking on the pertinent links shown in FIG. 4. Other information about the message such as To, From, Subject, Subscribers, Send Date, Billing Codes, Footer, Message Notes, Spam Score, and HTML consultant is also noted on the warning page 162. Dynamic content may also be included in the personalized message.

Figure 5:
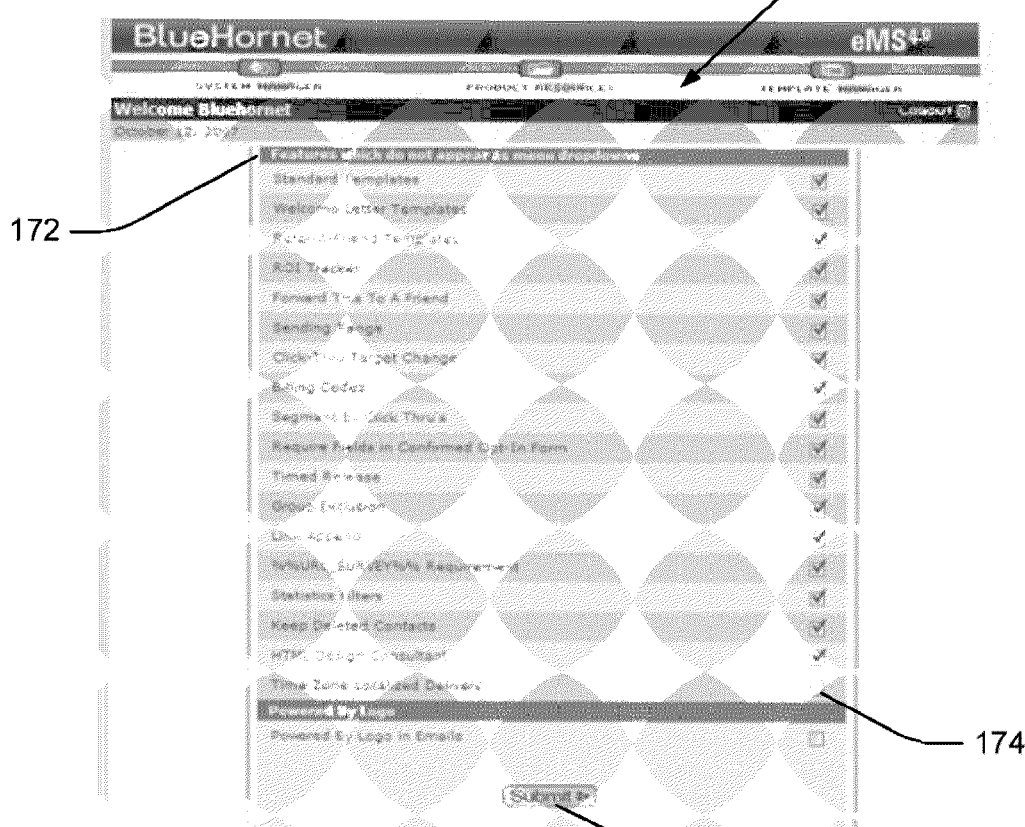

FIG. 5 illustrates a subaccount page 170. In another preferred embodiment, localized time zone delivery can be activated and deactivated in administrative and sub account management pages which makes localized time zone delivery appear and disappear in client and sub accounts pages. In the subaccount page 170, there is a list 172 of features which do not appear in menu dropdowns. Here the user can click Time zone localized delivery 174 to remove the option from menu dropdowns. Clicking Submit 176 would save the changes made on this page 170. It will be understood by one of ordinary skill in the art that this page 170 is an example of a sub account or reseller page, and that localized time delivery can be modified to fit any e-commerce business system for sending messages. Full administration activates localized time zone delivery for client accounts and reseller accounts. If a client account has option, the user can activate the option for the particular client account's sub accounts. Moreover, if a reseller account has the feature, the user can activate the feature for one of their resale client accounts. If the reseller's client account has the feature, that client account can activate it for that client account's sub accounts.

In another embodiment of localized time zone delivery system and method, the user is capable of searching by "Subscriber Time zone". Furthermore, the user can view and send by a listing of "Daylight" savings time zones. Localized time zone delivery has fields that capture subscriber internet protocol (IP) information in various parts of the system for use in geo-location projects. It will be evident to one of ordinary skill in the art that not all subscribers will have a default time zone value. There will be cases where a message will be sent to groups that include subscribers without a value in the "Subscriber Time zone" field.

The user may set a policy for the feature that requires users who are creating and editing recurring or scheduled messages to set the send time for these messages a minimum of four hours before the message is scheduled to be first sent in a time zone. For example, if a customer would like to use the time zone day parting feature to deliver a message to all subscribers at 4:00 PM (relative), then they must schedule the send in the system before 12:00 Pacific time.

In summary, the localized time delivery system utilizes a database with customer profile data where each customer record includes an email address and time zone information. It will be understood by one of ordinary skill in the art that the current time zone information can be determined by a variety of methods and systems, one of which includes an email campaign manager. The localized time zone delivery utilizes user input to create rules that ultimately send messages on regular intervals based upon that time zone information. The email campaign manager will send personalized messages to customers based upon these rules and time zones. The personalized messages may have dynamic content and be editable in an email editing system or module. Tables 2 and 3 describe requirements for user interface and use cases.

TABLE 2

User Interface Requirements

| ID | Requirement |
|---|---|
| 1. | Message/Editing Creation Page - Create a radio button in the message creation pages for scheduled and recurring messages that enables the feature for a message. |
| 2. | Import Pages - Add a new standard field called "Subscriber Time zone" to the standard field dropdown that is located on import field mapping page (second step of the import process). |
| 3. | Search Pages - Add "Subscriber Time zone" to the individual search results page for a subscriber. |
| 4. | Add a new standard field called "Subscriber Time zone" Make changes to pages where the standard fields are presented<br>(1) Import field mapping page<br>(2) Export pages<br>(3) Search - Individual subscriber results page<br>(4) Standard and Survey polling survey pages |
| 5. | Make changes to the message sending process that allows for the branching of the different time zone sends within the same message_id |
| 6. | Create validation on the message sending pages:<br>Scheduled Messages: Will only allow the user to schedule time zone localized message a minimum of 4 hours in advance of the first message to be sent in Pacific time. |
| 7. | Create functionality that checks to see if some of the subscribers selected do not have a value in the "Subscriber Time zone" field. If this is the case with a message, then alert the user on the message creation page that:<br>"Some subscribers selected for this message do not have a "Subscriber Time zone" value selected. These subscribers will be sent the message at the scheduled hour in the Standard Time zone." |
| 8. | Optional: include in search the ability to search by time zone using the time zone drop down used in standard and survey polling sign up pages. |

TABLE 3

Use Cases

| ID | Use Case |
|---|---|
| 1. | A marketing user has found that their messages have the most impact when they are sent so that they arrive close to 8 AM in their subscribers' inboxes. The user creates a message and through the use of the new feature, sets the time for the message to be sent so that the message will arrive around 8 AM in the time zone of each of the subscribers on the mailing list. |
| 2. | A marketing user would like to begin using the Time Zone Day Parting feature with their account. The user sorts their list of subscribers in their in-house database by locale and adds a column for time zone preference. The user then imports that list into the system so that the time zone value is added to each subscriber's record. |
| 3. | A user retrieves a recurring message from the system and decides that they would like to begin using the time zone day parting feature. The user selects the Time Zone Day part radio button and selects the time (relative) that they would like the message to be delivered in each subscriber's time zone. If the system detects that the user's scheduled time is less than four (4) hours away from current time, then:<br>The system asks the user to change the scheduled time to allow for more than 4 hours before the first Pacific time zone sending or . . .<br>Alerts the user that some users will receive the recurring message in the next business day. |
| 4. | A user creates a scheduled message in the system and decides that they would like to use the time zone day parting feature. The user selects the time zone day part radio button and selects the time (relative) that they would like the message to be delivered in each subscriber's time zone. If the system detects that the user's scheduled time is less than four (4) hours away from current time, then:<br>The system asks the user to change the schedule time to allow for more than 4 hours before the first time zone sending because some recipients will not receive the message if the time the user selected is used. |

Table 4 is an example schema for the backend processes of localized time zone delivery. The code shows both the actual functionality of localized time zone delivery and also how to make certain the variety of subscribers are built in arrays according to time zones.

TABLE 4

Example Schema

```
foreach ($all_lists as $tz_offset => $list_files) {
    foreach ($list_files as $listname) {
        // Set start time for that timezone based on offset
        if (!$exec_times[$tz_offset]) {
            $exec_times[$tz_offset] = $exec_time_main +
            $tz_offset ;
        }
        // Add the rate limiting on the list, and format it for Job
        Engine
        $exec_time = date("Y-m-d H:i:s",
        $exec_times[$tz_offset]);
        $exec_times[$tz_offset] += $seconds_per_list;
        if(!$sl_status_logged){
            $message->insertStatus('SL','Transferring List
            Files');
        }
        fork_command('SEND_LIST', $listname, $exec_time,
        'NULL',
'NULL', $JOBID, $job_priority);
        if(!$sl_status_logged){
            $message->insertStatus('SC','Message Sent');
            $sl_status_logged = true;
        }
```

TABLE 4-continued

Example Schema

```
    }
}
```

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A computerized local time zone message delivery system for use on a network, the computerized local time zone message delivery system comprising:
   a memory;
   a processor;
   a display;
   a database stored in the memory having a plurality of subscriber records that each include an email address for a subscriber and a time zone preference for a subscriber;
   an instruction set at least a part of which is stored in the memory which, when executed by the processor, causes the processor to perform operations of:
   comparing a specified time of day in a first subscriber's time zone preference to a current time of day in the first subscriber's time zone preference;
   delaying the sending of the message until the current time of day in the first subscriber's time zone preference is substantially equal to the specified time of day in the first subscriber's time zone preference, when the current time of day in the first subscriber's time zone preference is before the specified time of day in the first subscriber's time zone preference;
   producing a warning if the current time of day in the first subscriber's time zone preference is past the specified time of day in the time zone of the first subscriber; and
   holding the first message until, the current time of day in the-first subscriber's time zone preference equals the specified time of day.

2. The computerized local time zone message delivery system of claim 1 wherein the instruction set further causes the processor to perform operations of creating dynamic content for the message.

3. The computerized local time zone message delivery system of claim 2 further comprising an editor operatively configured to create the dynamic content in a format selected from a group consisting of: plain text, rich text, hypertext markup language.

4. The computerized local time zone message delivery system of claim 1 wherein the computerized local time zone message delivery system further comprises a default rule used when a time zone preference value is absent from a subscribers profile for sending messages in the absence of a time zone preference value.

5. The computerized local time zone message delivery system of claim 1 wherein the instruction set further causes the processor to present a prompt that, when selected overrides the holding of the first message and sends the first message even though the current time of day in the first subscriber's time zone preference is past the specified time of day in the-first subscriber's time zone preference.

6. The computerized local time zone message delivery system of claim 1 wherein the warning message includes a prompt for editing the message.

7. The computerized local time zone message delivery system of claim 2 wherein creating dynamic content for the message includes content to personalize the message.

8. A computerized method for managing local time message delivery of email messages for use on a network performed by a system having
   a processor and
   memory operating under the control of program code within a software module, and
   a display, the method comprising:
   storing a subscriber record for each of a plurality of subscribers, the subscriber record including an email address and a time zone preference for each subscriber;
   creating a rule for sending a personalized email message relative to each subscriber's local time zone preference, the rule specifying the time of day when a personalized email message is to be delivered;
   comparing the specified time of day for a plurality of time zone preferences to a current time of day in each subscriber's time zone preference;
   holding at least one personalized email message when the current time of day in a time zone of preference is later than the specified time of day in the time zone preference;
   displaying a warning when the specified time of day in a time zone preference has already passed.

9. The method of claim 8 further comprising creating dynamic content for the personalized email message based on a business user input entered through the interface to the system.

10. The method of claim 9 wherein creating dynamic content includes selecting a format from a group consisting of: plain text, rich text, hypertext markup language.

11. The method of claim 8 further comprising presenting an option to send the personalized email message even though the current time of day in a time zone of preference is later than the specified time of day in the time zone preference.

12. The method of claim 11 further comprising displaying a prompt to edit the at least one held personalized email message.

13. The method of claim 8 further comprising:
   displaying a prompt to edit the at least one held message; and
   receiving a response to the prompt and, in response to the prompt sending at a later time than the specified time within the time zone preference.

14. The method of claim 8 further comprising sending the personalized email message to each of a plurality of subscribers in a first time zone preference when the specified time of day equals the current time of day in the first time zone over the network utilizing the rule, each of the plurality of subscribers receiving the personalized email message substantially at the specified time of day in the first time zone.

<p align="center">* * * * *</p>